(12) United States Patent
Sakuma (10) Patent No.: US 10,717,523 B2
(45) Date of Patent: Jul. 21, 2020

(54) AIRCRAFT AND FLIGHT SYSTEM

(71) Applicant: Ricoh Company, Ltd., Tokyo (JP)

(72) Inventor: Hideomi Sakuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 336 days.

(21) Appl. No.: 15/921,881

(22) Filed: Mar. 15, 2018

(65) Prior Publication Data

US 2018/0265191 A1 Sep. 20, 2018

(30) Foreign Application Priority Data

Mar. 17, 2017 (JP) .................................. 2017-053740
Jan. 18, 2018 (JP) .................................. 2018-006758

(51) Int. Cl.
*B64C 29/02* (2006.01)
*B64C 11/46* (2006.01)
(Continued)

(52) U.S. Cl.
CPC .............. *B64C 29/02* (2013.01); *B64C 11/46* (2013.01); *B64C 39/024* (2013.01);
(Continued)

(58) Field of Classification Search
CPC .............. B64C 29/02; B64C 2201/021; B64C 2201/042; B64C 2201/044;
(Continued)

(56) References Cited

U.S. PATENT DOCUMENTS

| 2002/0074452 A1* | 6/2002 | Ingram | ..................... B64C 3/40 244/7 B |
|---|---|---|---|
| 2018/0029703 A1* | 2/2018 | Simon | ..................... B64C 27/20 |
| 2018/0077350 A1* | 3/2018 | Grenier | ................ H04N 13/243 |

FOREIGN PATENT DOCUMENTS

| CN | 205239906 U | * | 5/2016 | ............. B64C 27/12 |
| CN | 205239906 U |   | 5/2016 | |

(Continued)

OTHER PUBLICATIONS

Extended European Search Report dated Aug. 3, 2018 in Patent Application No. 18161784.6.
(Continued)

*Primary Examiner* — Philip J Bonzell
*Assistant Examiner* — Tye William Abell
(74) *Attorney, Agent, or Firm* — Xsensus LLP (57) ABSTRACT

An aircraft includes propellers at a center of the airframe; a first power source; a pitch adjuster to change pitch angles of the propellers; a plurality of attitude control propellers; a second power source lower in output than the first power source; and a control circuit to control attitude of the airframe. The control circuit includes a first yaw rotation generation control unit to control first yaw rotation generated by torques of the propellers with the pitch adjuster; and a second yaw rotation generation control unit to control a second yaw rotation generated by torques generated by a difference in rotation speed between the attitude control propellers. The control circuit is configured to control the first yaw rotation generation control unit and the second yaw rotation generation control unit in accordance with a magnitude of a command value of yaw rotation.

8 Claims, 4 Drawing Sheets

(51) Int. Cl.
 B64C 39/02 (2006.01)
 G05D 1/08 (2006.01)
(52) U.S. Cl.
 CPC ...... *G05D 1/0808* (2013.01); *B64C 2201/021* (2013.01); *B64C 2201/027* (2013.01); *B64C 2201/042* (2013.01); *B64C 2201/044* (2013.01); *B64C 2201/104* (2013.01); *B64C 2201/108* (2013.01); *B64C 2201/146* (2013.01); *B64C 2201/165* (2013.01)
(58) Field of Classification Search
 CPC ........ B64C 2201/104; B64C 2201/108; B64C 2201/146; B64C 11/46; B64C 27/22; B64C 27/26; G05D 1/0808
 See application file for complete search history.

(56) References Cited

FOREIGN PATENT DOCUMENTS

| | | |
|---|---|---|
| CN | 105644776 A | 6/2016 |
| JP | 8-170919 | 7/1996 |
| JP | 2001-213397 | 8/2001 |
| JP | 2010-052713 | 3/2010 |
| JP | 2015-137092 | 7/2015 |
| JP | 2017-074804 | 4/2017 |

OTHER PUBLICATIONS

Xinhua Wang, et al., "Modeling and control of an agile tail-sitter aircraft", Journal of the Franklin Institute, vol. 352, No. 12, XP029325117, 2015, pp. 5437-5472.

James Vincent, "Sony creates drone company to find more customers for its image sensors", The Verge, https://www.theverge.com/2015/7/22/9013421/sony-drones-image-sensors, XP055494348, Jul. 2015, 2 pages.

Wayne Grayson, "Sony's drone prototype is a mini plane with vertical takeoff built for inspections and surveying (Video)", https://www.equipmentworld.com/sonys-drone-prototype-is-a-min-plane-with-vertical-takeoff-built-for-inspections-and-surveying-video/, XP055494347, Sep. 2015, 2 pages.

\* cited by examiner

AIRCRAFT AND FLIGHT SYSTEM

CROSS-REFERENCE TO RELATED APPLICATIONS

This patent application is based on and claims priority pursuant to 35 U.S.C. § 119(a) to Japanese Patent Application Nos. 2017-053740, filed on Mar. 17, 2017, and 2018-006758, filed on Jan. 18, 2018, in the Japan Patent Office, the entire disclosure of each of which is incorporated by reference herein.

BACKGROUND

Technical Field

The present disclosure relates to an aircraft and a flight system.

Related Art

A multicopter is known to achieve long flight and high payload by hybridizing power with a main rotor and a plurality of electric rotors. The main rotor is driven by a fuel-type reciprocating engine mounted on a central portion of an airframe to raise and lower the mass of the airframe. The electric rotors have a lower output than the main rotor and are disposed around the main rotor to control the attitude of the airframe.

SUMMARY

In an aspect of the present disclosure, there is provided an aircraft that includes an airframe; a plurality of propellers disposed at a center of the airframe; a first power source to rotate the plurality of propellers; a pitch adjuster to change pitch angles of the plurality of propellers; a plurality of attitude control propellers; a second power source to rotate the plurality of attitude control propellers, the second power source being lower in output than the first power source; and a control circuit to control attitude of the airframe. The control circuit includes a first yaw rotation generation control unit to control first yaw rotation generated by torques of the plurality of propellers with the pitch adjuster; and a second yaw rotation generation control unit to control a second yaw rotation generated by torques generated by a difference in rotation speed between the plurality of attitude control propellers. The control circuit is configured to control the first yaw rotation generation control unit and the second yaw rotation generation control unit in accordance with a magnitude of a command value of yaw rotation.

In another aspect of the present disclosure, there is provided a flight system that includes an operation device to transmit an operation command; a flight controller to calculate a command value of attitude control in accordance with the operation command transmitted from the operation unit; an airframe; a plurality of propellers disposed at a center of the airframe; a first power source to rotate the plurality of propellers; a pitch adjuster to change pitch angles of the plurality of propellers; a plurality of attitude control propellers; a second power source to rotate the plurality of attitude control propellers, the second power source being lower in output than the first power source; and a control circuit to control attitude of the airframe. The control circuit includes a first yaw rotation generation control unit to control first yaw rotation generated by torques of the plurality of propellers with the pitch adjuster; and a second yaw rotation generation control unit to control a second yaw rotation generated by torques generated by a difference in rotation speed between the plurality of attitude control propellers. The control circuit is configured to control the first yaw rotation generation control unit and the second yaw rotation generation control unit in accordance with a magnitude of a command value of yaw rotation calculated by the flight controller.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

For the purpose of long-time flight, it is preferable to increase the output of the engine than the output of the motor for attitude control, from the relationship between the fuel and the energy density of the battery. For contra-rotating propellers driven by an engine and having a variable pitch mechanism, changing the pitch angle of each propeller causes a difference in torque between the propellers, thus causing yaw rotation of the airframe. The torque of yaw rotation produced by the engine is very large. It is difficult to perform fine output control within a small output range with a variable pitch mechanism, unless a highly-accurate and highly-rigid link mechanism is used. It is not realistic to mount such a highly-accurate and highly-rigid link mechanism on a multicopter. In addition, when yaw rotation control is performed by giving a speed difference to each of clockwise (CW) rotation and counterclockwise (CCW) rotation of an attitude control motor, the output of the motor is relatively small and the motor can only rotate at a lower speed than the engine. A hybrid multicopter having no camera gimbal for shooting and inspection has to halt at a desired position to turn the camera to a subject by yaw rotation to shoot the subject. However, the yaw rotation torque generated by the engine is large and it is difficult to perform fine control, thus causing a problem that it is difficult to operate such a hybrid multicopter.

As described below an aircraft and a flight system according to embodiments of the present disclosure can enhance operability during yaw rotation of an airframe.

Embodiments

Below, an aircraft and a flight system according to an embodiment of the present disclosure is described with reference to the accompanying drawings. Here, an example in which it is applied to a tail-sitter-type vertical take-off and landing (VTOL) machine (hereinafter referred to as "tail sitter machine") is described as an example of an aircraft.

Figure 1:
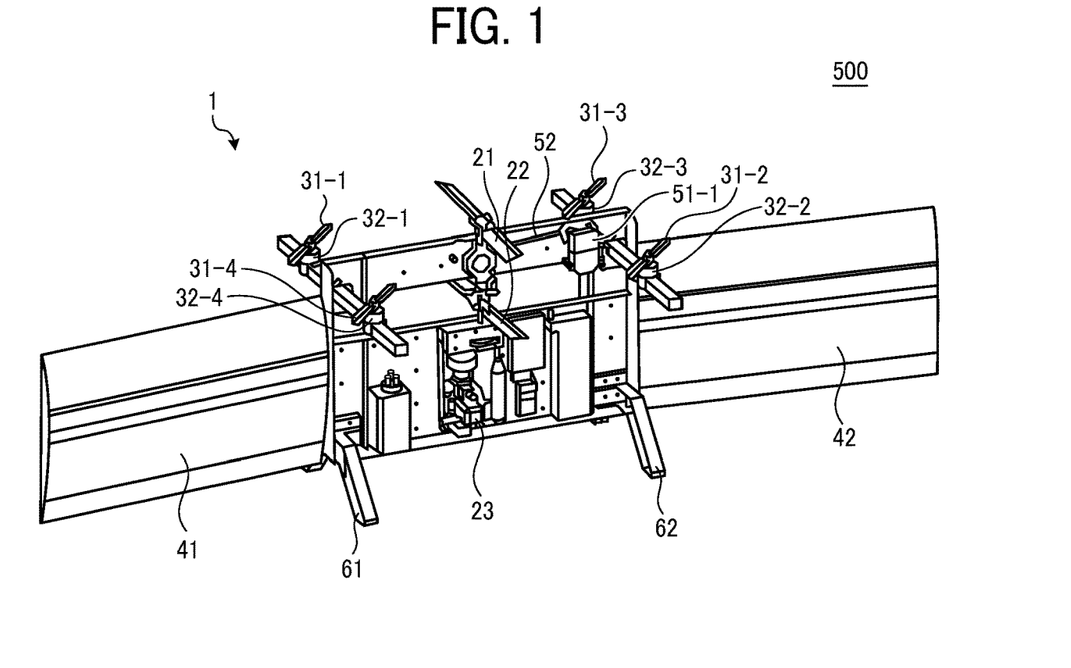
FIG. 1 is an illustration of an example of a configuration of a tail sitter machine according to an embodiment of the present disclosure.

FIG. 1 is an illustration of an example of a configuration of a tail sitter machine 500 as an aircraft according to the present embodiment. An airframe 1 of the tail sitter machine 500 illustrated in FIG. 1 is in a state of a vertical takeoff-and-landing attitude (vertical attitude). The airframe 1 of the tail sitter machine 500 illustrated in FIG. 1 includes, for example, a main propeller (a first propeller 21 and a second propeller 22), an engine 23 as an internal combustion engine, four attitude control propellers (a first attitude control propeller 31-1, a second attitude control propeller 31-2, a third attitude control propeller 31-3, a fourth attitude control propeller 31-4), respective electric motors of the four attitude control propellers (a first electric motor 32-1, a second electric motor 32-2, a third electric motor 32-3, a fourth electric motor 32-4), a servo motor 51-1 (an example of "servo control unit"), a link mechanism 52, a pair of fixed wings (a fixed wing 41 and a fixed wing 42), and two pairs of legs (a leg 61 and a leg 62). The airframe 1 of the tail sitter machine 500 controls components by a control circuit (see FIG. 4) mounted on the airframe 1.

The main propeller includes large-diameter propellers to mainly cause the airframe 1 to vertically take off and land. As illustrated in FIG. 1, the main propeller includes the first propeller 21 of a large diameter and the second propeller 22 of a large diameter arranged in the middle of the airframe 1 to rotate in mutually opposite directions.

The engine 23 is an example of "first power source" to rotate the main propeller. The "first power source" is not limited to the engine 23 but may be a power source having a higher output than the "second power source" described later. An engine output of the engine 23 is transmitted as torque to the first propeller 21 and the second propeller 22 of the main propeller via a drive train system contained in a clutch box, such as a flywheel, a centrifugal clutch, a one-way clutch, and a bevel gear. Starting the engine 23 and rotating the main propeller can generate propulsive force to lift the entire weight of the airframe 1.

Each of the four attitude control propellers (the first attitude control propeller 31-1, the second attitude control propeller 31-2, the third attitude control propeller 31-3, the fourth attitude control propeller 31-4) Is a small-diameter propeller to control the attitude of the airframe 1. The rotation of each attitude control propeller is controlled according to, e.g., an operation command and an attitude control command.

The arrangement of each of the attitude control propellers illustrated in FIG. 1 is, for example, a state in which each attitude control propeller is disposed in an intermediate region between the first propeller 21 and the second propeller 22 of the contra-rotating propellers. Here, the term "intermediate region" means a region interposed between the respective rotation planes of the first propeller 21 and the second propeller 22.

Here, particularly, an example is described in which each attitude control propeller is disposed in an area (on a parallel plane) located at an intermediate distance from the two rotation planes in the intermediate region. Each attitude control propeller may be disposed in or near an area at an intermediate distance between the two rotation planes in the intermediate region. Particularly, the arrangement of each attitude control propeller at a position near the center of gravity of the airframe 1 allows a sharp transition of the airframe 1.

The four electric motors (the first electric motor 32-1, the second electric motor 32-2, the third electric motor 32-3, the fourth electric motor 32-4) are an example of "second power source". An attitude control propeller is mounted on an output shaft of each electric motor.

For each electric motor, a direct current (DC) brushless motor capable of controlling the number of revolutions is adopted. Each electric motor rotates the corresponding attitude control propeller in accordance with the operation command and the attitude control command of the airframe 1.

The servo motor 51-1 and the link mechanism 52 are an example of a "pitch adjuster" to change the pitch angle of the first propeller 21 of the contra-rotating propellers. A "pitch adjuster" of the second propeller 22 of the contra-rotating propellers is disposed at an invisible position in FIG. 1. In this example, each of the two pitch adjusters of the first propeller 21 and the second propeller 22 is both constituted by a servo motor and a link mechanism. The configuration of the link mechanism is described later with reference to FIG. 3.

A pair of fixed wings (the fixed wing 41 and the fixed wing 42) has a structure to generate a lift force at the time of flight. When the airframe 1 switches from vertical take-off to flight, the airframe 1 tilts from the vertical attitude in the pitch direction by 90 degrees, that is, the airframe 1 rises to a horizontal flight attitude. Thereafter, when the airframe 1 accelerates in the flight direction and the speed increases, a difference in pressure arises between an upper surface (a front-side surface in FIG. 1) and a lower surface (a back-side surface in FIG. 1) of each of the fixed wing 41 and the fixed wing 42. Thus, the airframe 1 receives a lift force from the fixed wing 41 and the fixed wing 42.

The two pairs of legs (the leg 61 and the leg 62) are to land the airframe 1 in a vertical attitude on a vertical takeoff and landing area (for example, on the ground). Providing the leg 61 and the leg 62 allows the airframe 1 to take off or land in a vertical attitude without using a special starting device or a collecting device to recover the airframe 1 from the landing point. For example, the leg 61 and the leg 62 allow landing at a destination of the tail sitter machine 500 and re-takeoff from the landing point.

Figure 2:
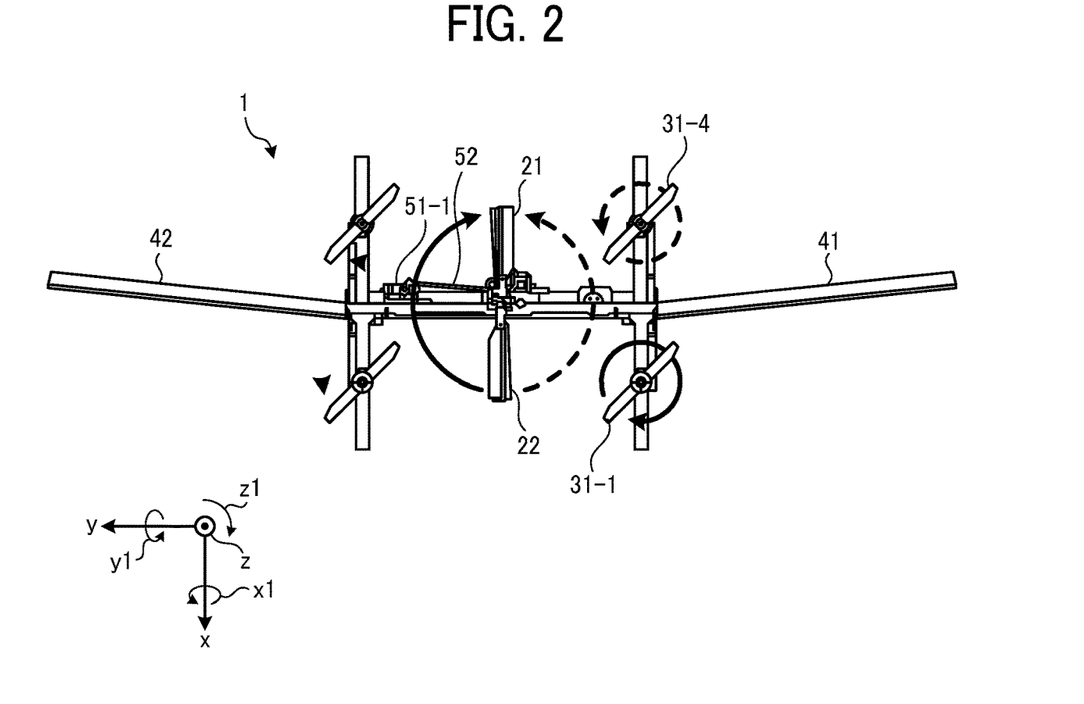
FIG. 2 is an illustration of rotation directions of propellers.

FIG. 2 is an illustration of the rotation directions of propellers. FIG. 2 is a top view of the airframe 1 illustrated in FIG. 1 with an example of the rotation directions of the propellers. Note that the front side and the back side of in FIG. 1 are illustrated on the upper side and the lower side in FIG. 2. In the example of the rotation directions illustrated in FIG. 2, the first propeller 21 rotates counterclockwise in a direction indicated by a broken arrow, and the second propeller 22 rotates clockwise in a direction indicated by a solid arrow that is a reverse direction of the rotation direction of the first propeller 21.

Further, in each attitude control propeller, the first attitude control propeller 31-1 and the second attitude control propeller 31-2 rotate clockwise in a direction indicated by solid arrows in FIG. 2. The third attitude control propeller 31-3 and the fourth attitude control propeller 31-4 rotate counterclockwise in a direction indicated by broken arrows in FIG. 2.

All of the attitude control propellers 31-1, 31-2, 31-3, and 31-4 may rotate at the same rotation speed or partly rotate at different rotation speeds according to the operation command and the attitude control command of the airframe 1. When the attitude control propellers 31-1, 31-2, 31-3, and 31-4 partly rotates at different rotational speeds, the balance of the propulsive forces of the respective attitude control propellers 31-1, 31-2, 31-3, and 31-4 changes, thus causing the attitude of the airframe 1 to be swung in one direction. Hence, utilizing the change in the balance of propulsive forces, the attitude control propellers are rotated to operate the airframe 1 in a hovering state.

Figure 3:
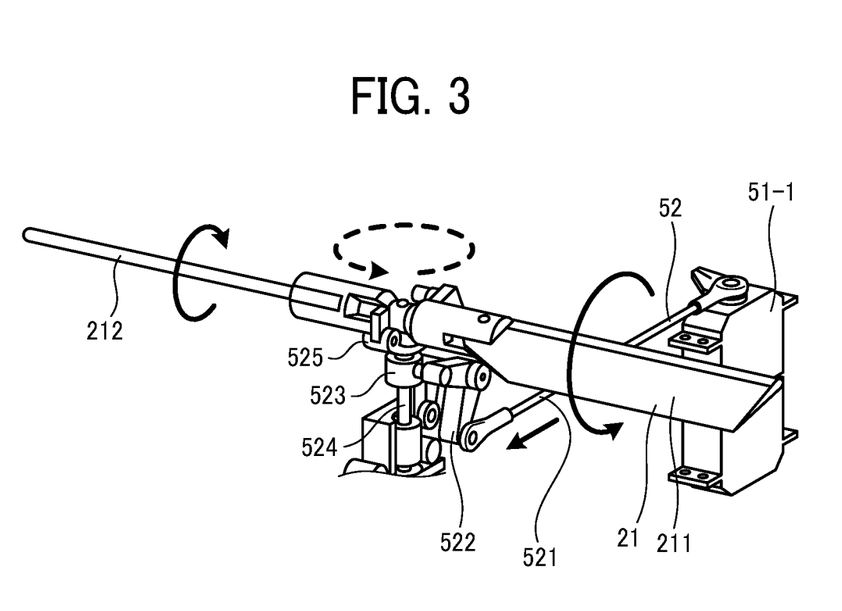
FIG. 3 is an enlarged view of a link mechanism.

FIG. 3 is an illustration of the link mechanism 52. FIG. 3 is an enlarged view of the link mechanism 52 of FIG. 1 and its peripheral portions. A broken arrow illustrated in FIG. 3 is an example of the rotation direction of the first propeller 21. As illustrated in FIG. 3, the link mechanism 52 rotates an L-shaped rotary arm 522 via a link 521 with driving of the servo motor 51-1. The L-shaped rotary arm 522 has one end connected to the link 521. By this rotation, a slide bearing 523 connected to the other end of the L-shaped rotary arm 522 is slid on a rotary shaft 524 of the first propeller 21. Above the slide bearing 523, the link mechanism 52 includes a movable portion 525 to tilt a pair of blades 211 and 212 of the first propeller 21 in the pitch angle direction with an inclination amount according to the pushing-up amount of the slide bearing 523.

In the example of operation illustrated in FIG. 3, the servo motor 51-1 rotates in the forward direction and the link 521 is pushed toward the first propeller 21. Thus, the L-shaped rotary arm 522 rotates and the slide hearing 523 slides upward. In this case, the pair of blades 211 and 212 of the first propeller 21 are respectively inclined in a direction indicated by the solid arrows in FIG. 3, that is, a direction in which the pitch angle increases.

When the servo motor 51-1 is rotated in the reverse direction, the link 521 pushed toward the first propeller 21 is pulled back and the L-shaped rotary arm 522 rotates in the reverse direction, and the slide bearing 523 slides downward. In this case, the pair of blades 211 and 212 of the first propeller 21 are respectively tilted in a direction opposite to the direction indicated by the solid arrows in FIG. 3, that is, a direction in which the pitch angle decreases.

Since the link mechanism of the second propeller 22 of the contra-rotating propellers has the same configuration as the link mechanism 52 of the first propeller 21, descriptions thereof are omitted here.

Next, a method of controlling the airframe 1 is described with reference to FIGS. 2 and 3. The control of each part described below is carried out by a control circuit of the airframe 1 based on a received signal (operation signal) of an operation command that is transmitted from an operation unit or other operation means on the ground and received by a receiver mounted on the airframe 1. Note that the operation command is not limited to the command transmitted from the ground. For example, when the airframe 1 has a size and an output allowing boarding of an operator, the operation command may be transmitted from the operation unit or other operation means mounted on the airframe 1. The configuration of the flight system including the airframe 1 and the steering means is described later with reference to an example illustrated in FIG. 5.

(Attitude Control from Vertical Attitude to Flight Attitude)

By rotating the airframe 1 by approximately 90° in the pitch direction, the airframe 1 can be shifted from the vertical attitude to the flight attitude. In this control, the rotational speeds of the first attitude control propeller 31-1 and the third attitude control propeller 31-3 among the four attitude control propellers are lowered and the second attitude control propeller 31-2 and the fourth attitude control propeller 31-4 are increased. Therefore, during a period of shift from the vertical attitude to the flight attitude, the control circuit controls the rotational speeds of the first electric motor 32-1 and the third electric motor 32-3 in a direction in which the output decreases, and controls the second electric motor 32-2 and the fourth electric motor 32-4 in such a direction as to increase the rotation speeds.

By this control, the airframe 1 in the vertical attitude tilts to a substantially horizontal flight attitude. When hovering in the vertical attitude, the propulsive force from the propellers were obtained in the vertical direction relative to the ground. However, when the airframe 1 becomes substantially horizontal, the propulsive force for lifting the self weight of the airframe 1 cannot be obtained from the propellers. After shifting to the flight attitude, as the speed of the airframe 1 rises, the airframe 1 receives the lift force from the fixed wing 41 and the fixed wing 42, thus allowing continuous flight with the lift force. In the flight attitude, flight control is performed by controlling rotation of the attitude control propellers and the contra-rotating propellers.

(Attitude Control from Flight Attitude to Vertical Attitude)

By rotating the airframe 1 by approximately −90° in the pitch direction, the airframe 1 can be shifted from the flight attitude to the vertical attitude. In this control, the rotation speeds of the first attitude control propeller 31-1 and the third attitude control propeller 31-3 among the four attitude control propellers are increased and the rotation speeds of the second attitude control propeller 31-2 and the fourth attitude control propeller 31-4 are lowered. Therefore, the control circuit controls the rotational speeds of the first electric motor 32-1 and the third electric motor 32-3 in a direction in which the output rises, and controls the second electric motor 32-2 and the fourth electric motor 32-4 in a direction in which the rotation speeds decrease.

By this control, the airframe 1 returns to the vertical attitude. Since the propulsive force from the propellers is obtained in the vertical direction relative to the ground after the vertical attitude, hovering in the vertical attitude can be maintained by control of the propellers.

During each rotation of the roll rotation and the pitch rotation, the pitch angle of the first propeller 21 and the pitch angle of the second propeller 22 of the contra-rotating propellers are adjusted to the same angle. As a result, since the torque difference between the first propeller 21 and the second propeller 22 is canceled out, there is no influence on the rotation of the airframe 1 in the roll rotation or pitch rotation.

(Rotation Control in Yaw Direction in Vertical Attitude)

In the rotation control in the yaw direction in the vertical attitude, a torque difference is generated in a direction opposite to a direction to be rotated.

For example, when yaw rotation is performed in a z1 direction of a yaw axis z in FIG. 2, the following two controls are performed. First control is to control the pitch angle of the first propeller 21 in the contra-rotating propellers to be large and the pitch angle of the second propeller 22 to be small. By this control, the airframe 1 starts to rotate in the z1 direction, which is in a counter torque direction with high torque, and rotates yawing. Such control is defined as first yaw rotation generation control. Second control is to increase the rotation speeds of the third attitude control propeller 31-3 and the fourth attitude control propeller 31-4 and reduce the rotation speeds of the first attitude control propeller 31-1 and the second attitude control propeller 31-2 among the four attitude control propellers. Such control causes a difference in rotation speed. As the rotation speed is higher, the torque is higher, thus causing yaw rotation of the airframe 1 in the z1 direction, which is the counter torque direction. Such control is referred to as second yaw rotation generation control.

In the first yaw rotation generation control, a larger torque is generated than the second yaw rotation generation control. When the torque is large, the yaw rotation speed is high. When the torque is small, the yaw rotation speed is slow. To improve the stop position accuracy of the yaw rotation of the airframe 1 by controlling the minute torque with the pitch adjusters of the main propellers, the strength of the parts is increased by reducing the play and backlash of each part of the link mechanism. In such a case, the fine angle control of the pitch angle may be needed, thus causing an increased weight of the airframe. On the other hand, for the configuration described in this embodiment, yaw rotation can be controlled by not only the first yaw rotation generation control but also the second yaw rotation generation control. Accordingly, the stop position accuracy of the yaw rotation of the airframe 1 can be enhanced with a more simple configuration than the case in which the weight of the airframe 1 is increased by increasing the strength of the link mechanism.

In the present embodiment, the first yaw rotation generation control that can rotate at a high speed and the second yaw rotation generation control that can rotate at a low speed are used in combination for coarse adjustment and fine adjustment, respectively. For example, for the attitude control when disturbance, such as wind, is small, it is difficult to match the stop position if the aircraft is steeply turned with large torque. In such a case, it is easier to match the stop position by slowly turning the aircraft with a small torque. When a steep turn is needed, it takes a longer time to turn with a small torque, and therefore the aircraft is turned to near the stop position with a large torque. For attitude control when disturbance, such as wind, is small, only the second yaw rotation generation control is used. At the time of a steep turn, only the first yaw rotation generation control is used or the first yaw rotation generation control and the second yaw rotation generation control are used together.

Switching between the first yaw rotation generation control and the second yaw rotation generation control is performed based on thresholds values of control input values that are input to electronic speed controllers (ESC) to supply power the servo motor 51-1 and the servo motor 51-2, which change the pitch angle, and the electric motors 32-1, 32-2, 32-3, and 32-4.

Figure 4:
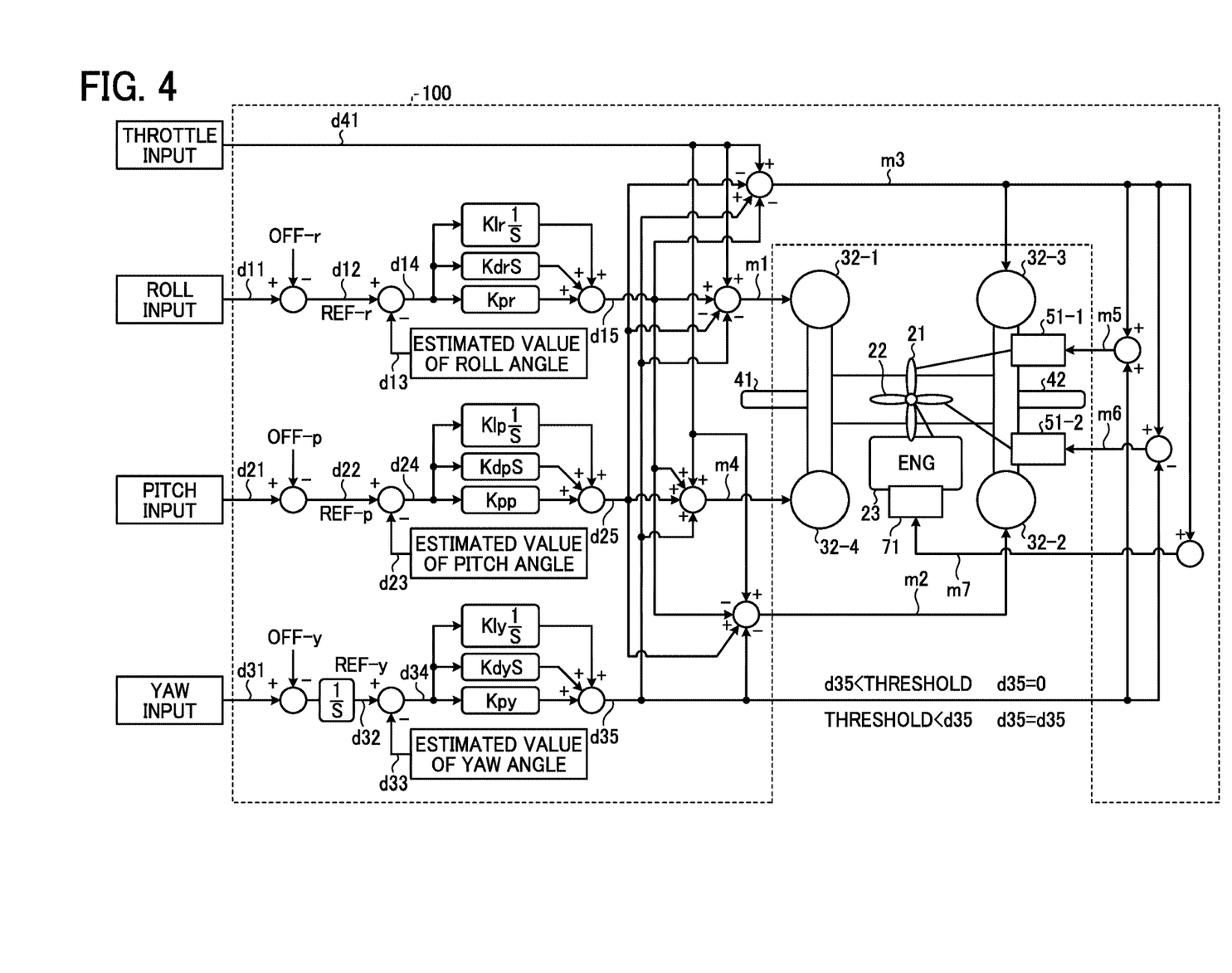
FIG. 4 is an illustration of an example of a configuration of a control block of a control circuit mounted on an airframe.

FIG. 4 is a diagram of an example of the configuration of a control block of a control circuit (as an example of "controller") mounted on the airframe 1 of the tail sitter machine 500. The control circuit is a control circuit including both "first yaw rotation generation control means" that operates to perform the first yaw rotation generation control and a "second yaw rotation generation means" that operates to perform the second yaw rotation generation control. FIG. 4 illustrates a configuration of a control block 100 that processes an operation command from a radio control transmitter (also referred to as "propo") used for a radio control airplane or the like as an example. In this example, it is assumed that the propulsive force obtained by the rotation of a motor is linear to the value of pulse width modulation (PWM) which is the input value to the motor. Radio communication with the propo is performed in, for example, the 2.4 GHz band.

The control block 100 illustrated in FIG. 4 is mounted on a flight controller 200 having a central processing unit (CPU). In addition to the CPU, the flight controller 200 may include various sensors, such as a micro electronic mechanical system (MEMS) gyroscope, a geomagnetic sensor, and an atmospheric pressure sensor, used to estimate the self position and attitude. The flight controller 200 may also be connectable to a global positioning system (GPS).

The flight controller also includes an analog output circuit and a digital output circuit, and externally outputs digital or analog control values. In addition, if a camera is mounted on the airframe, the flight controller can perform, e.g., shutter control of the camera and control of the gimbals.

In FIG. 4, in addition to the configuration of the control block 100 of the control circuit, motors or the like to be controlled are illustrated so that the correspondence relationship with the control target of the control block 100 can be easily understood. The control block 100 controls the rotation angle of the servo motors 51-1 and 51-2 by the PWM control when the operation command and the attitude control command are inputted.

Subsequently, the configuration of the control block 100 in FIG. 4 is described along signal processing of various operation commands (e.g., throttle signal, roll signal, pitch signal, yaw signal) input from the propo.

The flight controller calculates the attitude control command based on the roll signal, the pitch signal, and the yaw signal of the steering commands input from the propo.

For example, the flight controller subtracts an offset (OFF-r), which is set by trimming for fine adjustment, from an input value d11 of the roll signal to obtain a deviation, and sets the deviation to a target value (REF-r) d12 of the roll. Further, subtracting an offset (OFF-p), which is set by trimming for fine adjustment, from an input value d21 of the pitch signal to obtain a deviation and sets the deviation to a target value (REF-p) d22 of the pitch. When there is no input of the roll signal and the pitch signal, the target value d12 of the roll and the target value d22 of the pitch in the hovering are "0" because the airframe is horizontal.

Subsequently, regarding the roll, the flight controller estimates the roll angle from the attitude angle data of the sensor, outputs an error d14 between the roll target value d12 and the roll angle estimated value d13, multiplies an integral value of the error d14 and a differential value of the error d14 by a control gain to obtain a multiplied value, and adds the control gain to the multiplied value to obtain a control amount d15 of the roll. To obtain stable values, the control gain is determined together with other control gains of pitch and yaw by actually hovering the airframe 1. If an inappropriate control gain enters, a failure, such as inconstant attitude or unstable attitude due to vibration, will occur. Therefore, a stable value can be determined.

The flight controller performs similar signal processing for pitch. That is, the flight controller estimates the pitch angle from the attitude angle data of the sensor, outputs an error between the pitch target value and the pitch angle estimated value d23, multiplies the integrated value of the error d24 and the differential value of the error d24 by a control gain to obtain a multiplied value, and adds the control gain to the multiplied value to obtain a control amount d25 of the pitch.

The yaw signal is processed as follows. The flight controller calculates a deviation by subtracting an offset (OFF-y), which is set by trimming for fine adjustment, from an input value d31 of the yaw signal, further accumulates the deviation by an integrating circuit, and sets the accumulated value to a target value (REF-y) d32. This process is performed to accumulate input values of the yaw signal from the propo and stop the rotation in the yaw direction when there is no input.

Subsequently, the flight controller estimates the yaw angle from the attitude angle data of the sensor, outputs an error between the yaw target value and an yaw angle estimated value d33, and multiplies the difference between the integrated value of the error d34 and the differential value of the error d34 by a control gain to obtain a multiplied value, and adds the control gain to the multiplied value to obtain a control amount d35 of the yaw.

To the four attitude control motors (the first electric motor 32-1, the second electric motor 32-2, the third electric motor 32-3, the fourth electric motor 32-4) to be controlled, the control amount d41 of the throttle which is the control command of the operation command, the control amount d15 of the roll which is the attitude control command, the control amount d25 of the pitch, and the control amount d35 of the yaw are added and subtracted by a calculation method illustrated in FIG. 4 (in which "+" Indicates addition and "−" indicates subtraction) to output the respective control values m1, m2, m3, and m4.

The control amount d41 of the throttle and the control amount d35 of the yaw, respectively, are output to the servo motors 51-1 and 51-2 (for adjusting the pitch angle) to be controlled. The flight controller calculates the rotation angles of the servo motors 51-1 and 51-2 based on the control values m5 and m6, respectively, which are obtained by adding or subtracting the throttle control amount d41 and the yaw control amount d35 according to the calculation method illustrated in FIG. 4. The control amount d41 of the throttle is output to an engine throttle 71 of the engine 23.

Next, the control of the control block 100 performed when the yaw signal is input is described below. Here, as an example, the control for obtaining a propulsive force and the control for rotating in the yaw direction during hovering are described.

(Control to Obtain Propulsive Force)

In FIG. 4, when only the throttle control amount d41 becomes large, the control values m1, m2, m3, and m4 to the attitude control motors (the first electric motor 32-1, the second electric motor 32-2, the third electric motor 32-3, the fourth electric the motor 32-4) become high, thus increasing the propulsive force of each attitude control motor. At the same time, the control values m5 and m6 of the servo motors 51-1 and 51-2 for controlling the pitch angles of the contra-rotating propellers also become high, and the pitch angles of the first propeller 21 and the second propeller 22 become large, thus increasing the propulsive force of the contra-rotating propellers. The control amount d41 of the engine throttle 71 of the engine 23 is increased and the engine output is increased. Accordingly, the airframe 1 floats and rises while maintaining the horizontal attitude.

The balance of the rotation speed between the attitude control motors is adjusted by giving an offset for fine adjustment by the trimming of the transmitter.

(Control to Rotate in Yaw Direction)

In FIG. 4, when the yaw signal is input and the yaw control amount d35 is larger than a threshold value set in the control block 100, the yaw control amount d35 is input as a positive command value to the servo motor 51-1 and the yaw control amount d35 is input as a negative command value to the servo motor 51-2. Thus, the control values m5 and m6 are calculated. The pitch angle of the first propeller 21 of the contra-rotating propellers is set to be large and the pitch angle of the second propeller 22 is set to be small. The difference in the pitch angle causes a torque difference, thus rotating the airframe 1 in yaw direction. This is the first yaw rotation generation control. For the configuration illustrated in FIG. 4, also in the third electric motor 32-3 and the fourth electric motor 32-4 for attitude control, the yaw control amount d35 is input as a positive command value and the yaw control amount d35 is input as a negative command value to the first electric motor 32-1 and the second electric motor 32-2.

When the yaw control amount d35 is equal to or less than the threshold value set in the control block 100, the yaw control amount d35=0 is input to each of the servo motor 51-1 and the servo motor 51-2. Therefore, the control values m5 and m6 for the servo motors 51-1 and 51-2 are calculated with the throttle control amount d41. The rotation speed of each of the third attitude control propeller 31-3 and the fourth attitude control propeller 31-4 increases with the positive command value. The rotation speed of each of the first attitude control propeller 31-1 and the second attitude control propeller 31-2 decreases with the negative command value. In this manner, a torque difference occurs due to the difference in rotation speed between the attitude control propellers, thus causing yaw rotation of the airframe 1. This is the second yaw rotation generation control.

In this example, when the yaw control amount d35 is smaller than the threshold value, the yaw control amount d35 is not input to the servo motors 51-1 and 51-2. Accordingly, only the second yaw rotation control works. When the yaw control amount d35 is larger than the threshold value, the yaw control amount d35 is input to the servo motors 51-1 and 51-2, the first electric motor 32-1, the second electric motor 32-2, the third electric motor 32-3, and the fourth electric motor 32-4. Accordingly, both the first yaw rotation control and the second yaw rotation control work. Note that, in some embodiments, when the yaw control amount d35 is larger than the threshold value, only the first yaw rotation control may work.

By selectively using the first yaw rotation control and the second yaw rotation control according to the threshold value, the stop position accuracy is enhanced even when the yaw rotation of the airframe under attitude control is finely performed or even when the airframe steeply turns.

Note that other row controls, such as roll direction control, pitch direction control, and the control for moving the airframe from the vertical attitude to the flight control, can be understood in the same way from FIG. 4.

Figure 5:
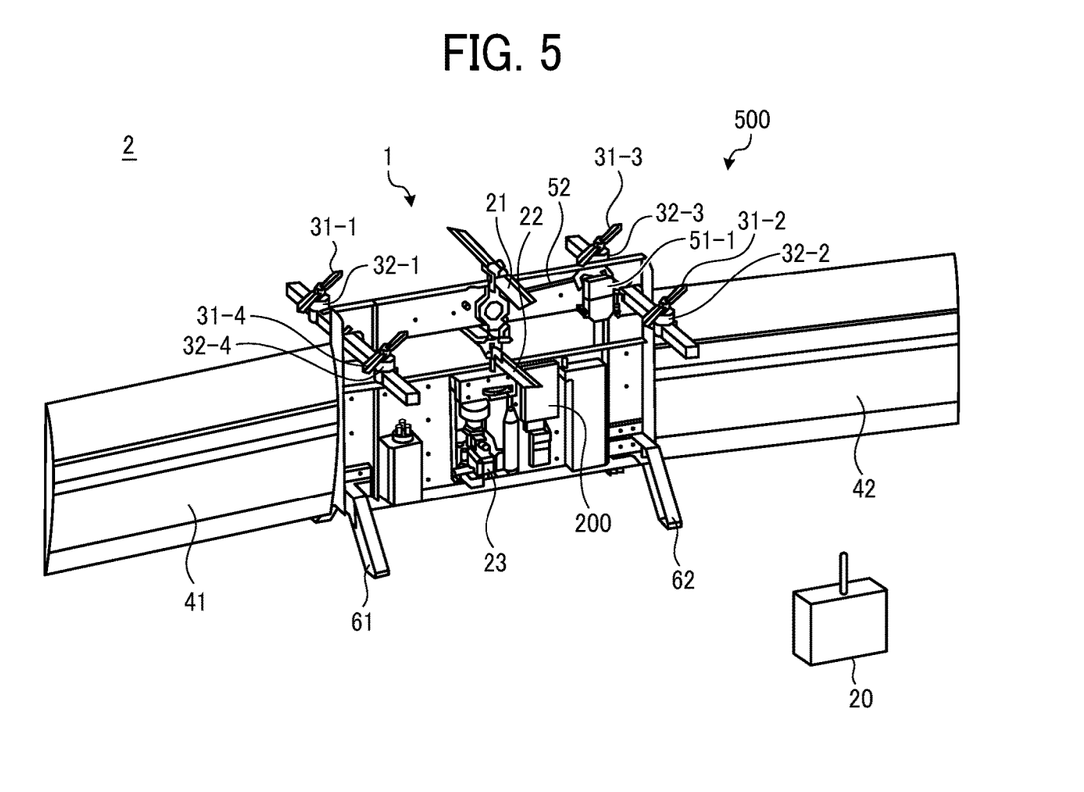
FIG. 5 is an illustration of an example of a flight system according to an embodiment of the present disclosure.

FIG. 5 is an illustration of an example of a flight system according to the present embodiment. The flight system 2 illustrated in FIG. 5 includes an airframe 1 and an operation device 20 as an operation unit or operation means. The operation device 20 is an operation device (e.g., a propo) to control the airframe 1.

The operation device 20 incorporates a wireless communication device, and transmits various operation commands (throttle signal, roll signal, pitch signal, and yaw signal) indicating the direction and speed of movement from various operation throttle operated by an operator to the airframe 1 through multiple channels.

The airframe 1 receives various operation commands, calculates attitude control commands from the various signals using the flight controller, to control the airframe 1. Since the airframe 1 has already been described above and redundant descriptions thereof are omitted here.

In the present embodiment, both the pitch angle of the first propeller 21 and the pitch angle of the second propeller 22 are changed to generate a torque difference in the contra-rotating propellers. Note that it is only necessary that a torque difference is generated in the contra-rotating propellers. Therefore, for example, the pitch angle of one of the first propeller 21 and the second propeller 22 may be changed.

For propellers of fixed pitch, for example, the method of generating the torque difference in the contra-rotating propellers may be carried out by increasing or decreasing the rotation speed of one propeller. In such a case, by increasing the rotation speed of one propeller, the torque of one propeller is increased, thus causing a torque difference with the other propeller. Alternatively, by slowing the rotation of one propeller, the torque of one propeller is decreased, thus causing a torque difference with the other propeller.

Alternatively, by making the rotation of one propeller faster and the rotation of the other propeller slower, a torque difference occurs between the two propellers.

In addition, the airframe is powered by an internal combustion engine, such as the engine 23, thus allowing long-distance flight. Furthermore, in the vertical attitude, the pitch angle of each propeller of the contra-rotating propellers rotated by the internal combustion engine is differentiated to generate a torque difference, thus allowing the airframe to rotate in the yaw direction during hovering.

Therefore, the flight system is useful for gathering information from distant sites where it is difficult to approach or enter from the ground. For example, the airframe flies horizontally to a site, hovers in the vertical attitude at the site, and gathers information by, e.g., camera shooting. Note that, if there is a terrain necessary for vertical landing at a destination where the tail sitter machine 500 advances, the airframe can land on the site to extend stationary information collection and standby time, even without hovering with poor energy efficiency.

Further, the tail sitter machine 500 according to the present embodiment includes the leg 61 and the leg 62. Such a configuration allows the airframe to re-take off after landing at the destination.

For example, a tail-sitter-type VTOL machine can perform flight and takeoff and landing at a fixed point, without requiring, e.g., a complicated and weight-increasing tilt mechanism, which is a relatively simple airframe configuration.

Further, in the present embodiment, a high output battery can be used to drive the attitude control propellers. Such a configuration can perform attitude control that enables an electric steep change in propulsive force.

As illustrated with one example in the present embodiment, when the propellers of the internal combustion engine having a larger output than the attitude control motors rotates at the center of the airframe, a relatively large torque difference is required to rotate the airframe in the yaw direction. According to the present embodiment, such a torque difference is generated in the propellers of the internal combustion engine, the airframe can be rotated in the yaw direction. Note that the propellers described in this embodiment may be, for example, rotors having no twisting angle.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An aircraft comprising:
   an airframe;
   a plurality of propellers disposed at a center of the airframe;
   a first power source to rotate the plurality of propellers;
   a pitch adjuster to change pitch angles of the plurality of propellers;
   a plurality of attitude control propellers;
   a second power source to rotate the plurality of attitude control propellers, the second power source being lower in output than the first power source; and
   a control circuit to control attitude of the airframe,
   the control circuit including:
      a first yaw rotation generation control unit to control first yaw rotation generated by torques of the plurality of propellers with the pitch adjuster; and
      a second yaw rotation generation control unit to control a second yaw rotation generated by torques generated by a difference in rotation speed between the plurality of attitude control propellers,
      the control circuit configured to control the first yaw rotation generation control unit and the second yaw rotation generation control unit in accordance with a magnitude of a command value of yaw rotation.

2. The aircraft according to claim 1,
   wherein the first power source is an internal combustion engine, and
   wherein the second power source is an electric motor adjustable in rotation speed.

3. The aircraft according to claim 1,
   wherein the plurality of attitude control propellers is disposed in a plane parallel to a rotation plane of each of the plurality of propellers.

4. The aircraft according to claim 3,
   wherein the plurality of attitude control propellers is disposed in a plane of an intermediate region between two propellers of the plurality of propellers.

5. The aircraft according to claim 1,
   wherein the pitch adjuster includes:
   a link mechanism to change a pitch angle of at least one propeller of a plurality of propellers provided as the propeller; and
   a servo control unit to drive the link mechanism.

6. The aircraft according to claim 1, further comprising a fixed wing to give a lift to the airframe at horizontal flight,
   wherein the control circuit changes a balance of propulsive forces of the plurality of attitude control propellers after vertical takeoff to raise the attitude of the airframe, and
   the control circuit controls rotation of the plurality of attitude control propellers and rotation of the plurality of propellers to perform flight control after the airframe is raised.

7. The aircraft according to claim 6, further comprising:
a leg to land on a vertical takeoff and landing area on vertical takeoff or landing,
   wherein the control circuit changes a balance of propulsive forces of the plurality of attitude control propellers to perform an attitude control from a vertical takeoff and landing attitude to flight attitude and another attitude control from the flight attitude to the vertical takeoff and landing attitude.

8. A flight system comprising:
an operation device to transmit an operation command;
a flight controller to calculate a command value of attitude control in accordance with the operation command transmitted from the operation device;
an airframe;
a plurality of propellers disposed at a center of the airframe;
a first power source to rotate the plurality of propellers;
a pitch adjuster to change pitch angles of the plurality of propellers;
a plurality of attitude control propellers;
a second power source to rotate the plurality of attitude control propellers, the second power source being lower in output than the first power source; and
a control circuit to control attitude of the airframe,
the control circuit including:
   a first yaw rotation generation control unit to control first yaw rotation generated by torques of the plurality of propellers with the pitch adjuster; and
   a second yaw rotation generation control unit to control a second yaw rotation generated by torques generated by a difference in rotation speed between the plurality of attitude control propellers,
   the control circuit configured to control the first yaw rotation generation control unit and the second yaw rotation generation control unit in accordance with a magnitude of a command value of yaw rotation calculated by the flight controller.

* * * * *